US008025574B2

(12) United States Patent
Hilbert

(10) Patent No.: US 8,025,574 B2
(45) **Date of Patent: *Sep. 27, 2011**

(54) METHOD AND APPARATUS FOR CHANGING FIRMWARE IN A GAMING PRINTER

(75) Inventor: John Hilbert, Torrance, CA (US)

(73) Assignee: FutureLogic, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,324

(22) Filed: Dec. 21, 2010

(65) Prior Publication Data

US 2011/0161948 A1 Jun. 30, 2011

Related U.S. Application Data

(63) Continuation of application No. 10/899,282, filed on Jul. 26, 2004, now Pat. No. 7,857,702.

(60) Provisional application No. 60/489,994, filed on Jul. 25, 2003.

(51) Int. Cl.
*A63F 9/24* (2006.01)
*A63F 13/00* (2006.01)

(52) U.S. Cl. .................. 463/47; 463/1; 463/25; 463/40; 463/42; 358/1.14; 358/1.15; 358/1.16

(58) Field of Classification Search ................ 463/1, 25, 463/40–43, 47; 358/1.14, 1.15, 1.16; 709/223–224, 709/250
See application file for complete search history.

(56) References Cited

U.S. PATENT DOCUMENTS

| | | | |
|---|---|---|---|
| 4,064,389 | A | 12/1977 | Patterson |
| 4,864,618 | A | 9/1989 | Wright et al. |
| 5,010,237 | A | 4/1991 | Kawana |
| 5,119,108 | A | 6/1992 | Hatakeyama |
| 5,386,469 | A | 1/1995 | Yearsley et al. |
| 5,643,086 | A | 7/1997 | Alcorn et al. |
| 5,742,677 | A | 4/1998 | Pinder et al. |
| 5,814,796 | A | 9/1998 | Benson et al. |
| 5,928,082 | A | 7/1999 | Clapper |
| 5,992,570 | A | 11/1999 | Walker et al. |
| 6,024,640 | A | 2/2000 | Walker et al. |
| 6,026,293 | A | 2/2000 | Osborn |
| 6,044,157 | A | 3/2000 | Uesaka et al. |
| 6,071,190 | A | 6/2000 | Weiss et al. |
| 6,106,396 | A | 8/2000 | Alcorn et al. |

(Continued)

OTHER PUBLICATIONS

One Look Dictionary Search, 'coupon' and 'voucher' via www.onelook.com (retrieved on Sep. 7, 2005):<URL:http://www.onelook.com/>.

*Primary Examiner* — Dmitry Suhol
*Assistant Examiner* — Ryan Hsu
(74) *Attorney, Agent, or Firm* — Fitzpatrick, Cella, Harper & Scinto

(57) ABSTRACT

Methods and apparatuses for changing firmware in a gaming printer. The printer containing computer memory, internal and/or external to the printer, with the memory divided logically into multiple parts; a first section containing computer codes, a second section containing the data describing the format of gaming vouchers, and a third section containing data describing the format of promotional coupons. A mathematically unique identifier is created as an individual signature for each section of the memory, with each signature being independent of the other signatures, thus allowing for the changing the contents of one or more sections of the memory without affecting the contents of the unchanged sections of the memory.

18 Claims, 6 Drawing Sheets

U.S. PATENT DOCUMENTS

| | | | | |
|---|---|---|---|---|
| 6,138,236 | A | 10/2000 | Mirov et al. | |
| 6,149,522 | A | 11/2000 | Alcorn et al. | |
| 6,219,836 | B1 | 4/2001 | Wells et al. | |
| 6,473,899 | B1 | 10/2002 | Nelson et al. | |
| 6,500,067 | B1 | 12/2002 | Luciano et al. | |
| 6,645,077 | B2 * | 11/2003 | Rowe | 463/42 |
| 6,722,986 | B1 | 4/2004 | Lyons et al. | |
| 6,763,396 | B2 | 7/2004 | Torikai | |
| 6,857,041 | B2 | 2/2005 | LeClerg | |
| 7,043,641 | B1 | 5/2006 | Martinek et al. | |
| 7,146,412 | B2 * | 12/2006 | Turnbull | 709/220 |
| 7,456,991 | B2 * | 11/2008 | Lay et al. | 358/1.16 |
| 2003/0023482 | A1 | 1/2003 | Messner et al. | |
| 2004/0243992 | A1 | 12/2004 | Gustafson et al. | |
| 2006/0059480 | A1 | 3/2006 | Kimoto | |
| 2006/0080732 | A1 | 4/2006 | Ohkubo et al. | |

* cited by examiner

METHOD AND APPARATUS FOR CHANGING FIRMWARE IN A GAMING PRINTER

CROSS-REFERENCE TO RELATED APPLICATIONS

This application is a continuation of U.S. patent application Ser. No. 10/899,282, filed Jul. 26, 2004, now allowed, which claims the benefit of U.S. Provisional Application No. 60/489,994, filed Jul. 25, 2003, the contents of each of which are hereby incorporated by reference as if set forth in full herein.

BACKGROUND OF THE INVENTION

1. Field of the Invention

This invention relates generally to printers and printer connected hardware used in cashless gaming machines and gaming, and more specifically to hardware and firmware operating within this equipment for performing promotional ticket printing, promotional data basing, printer and printer connected hardware based promotional ticket triggering, and gaming voucher printing.

2. Background

The gaming machine manufacturing industry provides a variety of gaming machines for the amusement of gambling players. An exemplary gaming machine is a slot machine. A slot machine is an electro-mechanical game wherein chance or the skill of a player determines the outcome of the game. Slot machines are usually found in casinos or other more informal gaming establishments.

The gaming machine manufacturers have more recently introduced cashless enabled games to the market and these have begun to find wide acceptance in that industry. Cashless enabled games are so named due to the fact that they can conduct their player's financial exchange with a mixture of traditional currency and vouchers. Typically, a cashless enabled game has as installed components a printer to produce the vouchers, and a bill acceptor that supports automatic reading of the vouchers. In a cashless enabled gaming system, when a player cashes out, the system is signaled and depending on the size of the payout, the system can either present coins in the traditional method of a gaming machine, or it can cause the printers which are installed in such machines to produce a voucher containing the value of the payout. The voucher may then either be redeemed for cash at a cashier's cage, or inserted into a bill acceptor which is installed in the same or another cashless enabled gaming machine at a participating casino, at which point the system will recognize the voucher, redeem it and place the appropriate amount of playing credits on the game.

Over the last several years, cash-less enabled games have found an increasing acceptance and use in the gaming industry with both the players, who enjoy the speed of play and ease of transporting their winnings around the casino, and the casinos who have realized significant labor savings in the form of reduced coin hopper reloads in the games, and an increase in revenue due to speed of play. This increasing acceptance practically guarantees a wide installed base of networked games with captive player audiences for couponing and promotional tickets using generally the same equipment already installed within the game for the purpose of supporting cash-less gaming vouchers.

The printer contained in the gaming machine includes electrical, mechanical and electronic hardware and a computer program that is included in a memory device such as a flash memory chip, or other programmable storage devices. This computer program is commonly referred to as firmware. The firmware controls the operation of the printer.

There is an approval process that requires gaming machine manufactures to submit gaming machines for testing and approval. These regulatory agencies, such as Nevada Gaming Control Board, Gaming Laboratories International Inc., etc. approve gaming machines, including the installed printers, for use in casinos. Part of the record keeping of these agencies is to maintain a record of the firmware versions contained in the gaming machines and their components. Agencies normally require a mathematical identifier unique for a particular firmware version, thus ensuring an accurate method of checking the contents of printers that are in the field. A single mathematically unique identifier representing the complete contents of a particular firmware version is normally supplied by the firmware manufacturer. Any changes to the firmware must be again submitted for testing and approval. This is a lengthy process, often requiring two to three months for submission and approval.

Practical field experience with the application has illustrated that there are areas needing improvement in the current printer designs and implementation within the game related to improved methods and means of verifying the correctness of the actual firmware that is contained in the printer program memory device and providing a means to modify firmware without a lengthy approval process.

SUMMARY OF THE INVENTION

In one aspect of the present invention, a cash-less enabled game installed printer includes a computer program, such as firmware, that resides in a printer memory that is installed inside of the printer module. A printer module being the electrical, mechanical, and electronic elements included in a complete printer capable of printing gaming vouchers, promotional coupons and other printed items of interest to a casino or its patrons. A mathematical formula is applied to the contents of the printer memory, often called the binary image of the firmware. This formula generates a number that represents the contents of the printer memory in a statistically unique way. Commonly used mathematical formulae include a checksum, Cyclic Redundancy Checks (CRC's), and Kobitron signatures among others. This number is used as a signature for the binary image of the firmware or data included in the sectioned memory.

In another aspect of the invention, the printer memory is divided into multiple sections. The mathematical formula is applied to each individual section of memory to create a number that represents the contents of each section. The sections of printer memory are divided generally, but not limited to three sections, as follows: a first section includes programming instruction codes used to operate the gaming printer that is not normally changed, a second section is a section of memory that contains gaming ticket information and may be changed occasionally, and a third section is a section of memory that contains a promotional data base used for coupon printing that may be changed more frequently.

The application of the mathematical formula to each section of the printer memory separately provides a method for updating memory in a gaming printer. In the method, a first memory section within the printer memory has an associated signature as do a second and third memory section. As each memory section includes its own signature, each memory section may be overwritten without affecting the others. For example, overwriting the second memory section without overwriting the first or third memory sections does not affect the signatures of the first and third memory sections as they remain unchanged. As another example, overwriting the third memory section without overwriting the first or second memory sections does not affect the signatures of the first and third memory sections as they remain unchanged.

In another aspect of the present invention, the sectioned printer memory is installed outside of the printer module.

In another aspect of the present invention, the sectioned printer memory resides in a storage medium that is installed in part outside of the printer module and in part inside of the printer module.

In another aspect of the invention, a method is provided for updating a gaming printer's firmware using an external device. The method includes providing a printer memory coupled to the gaming printer, the printer memory having a plurality of memory sections. The gaming printer is configured to generate a signature for a content of each memory section independently of each of the other memory sections. In operation, the gaming printer receives from the external device a firmware update, the firmware update including update content for a memory section selected from the plurality of memory sections. Once the gaming printer has received the firmware update, the gaming printer stores in the selected memory section the updated content without altering the content of any other memory section of the plurality of memory sections.

In another aspect of the invention, the content of the selected memory section includes printer operational information and the firmware update includes printer operational information with printer operation programming instructions and printer operation data.

In another aspect of the invention, the content of the selected memory section includes voucher information and the firmware update includes voucher information including voucher generation instructions and voucher data.

In another aspect of the invention, the content of the selected memory section comprises coupon information and the firmware update includes coupon information including coupon generation instructions; and coupon data.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
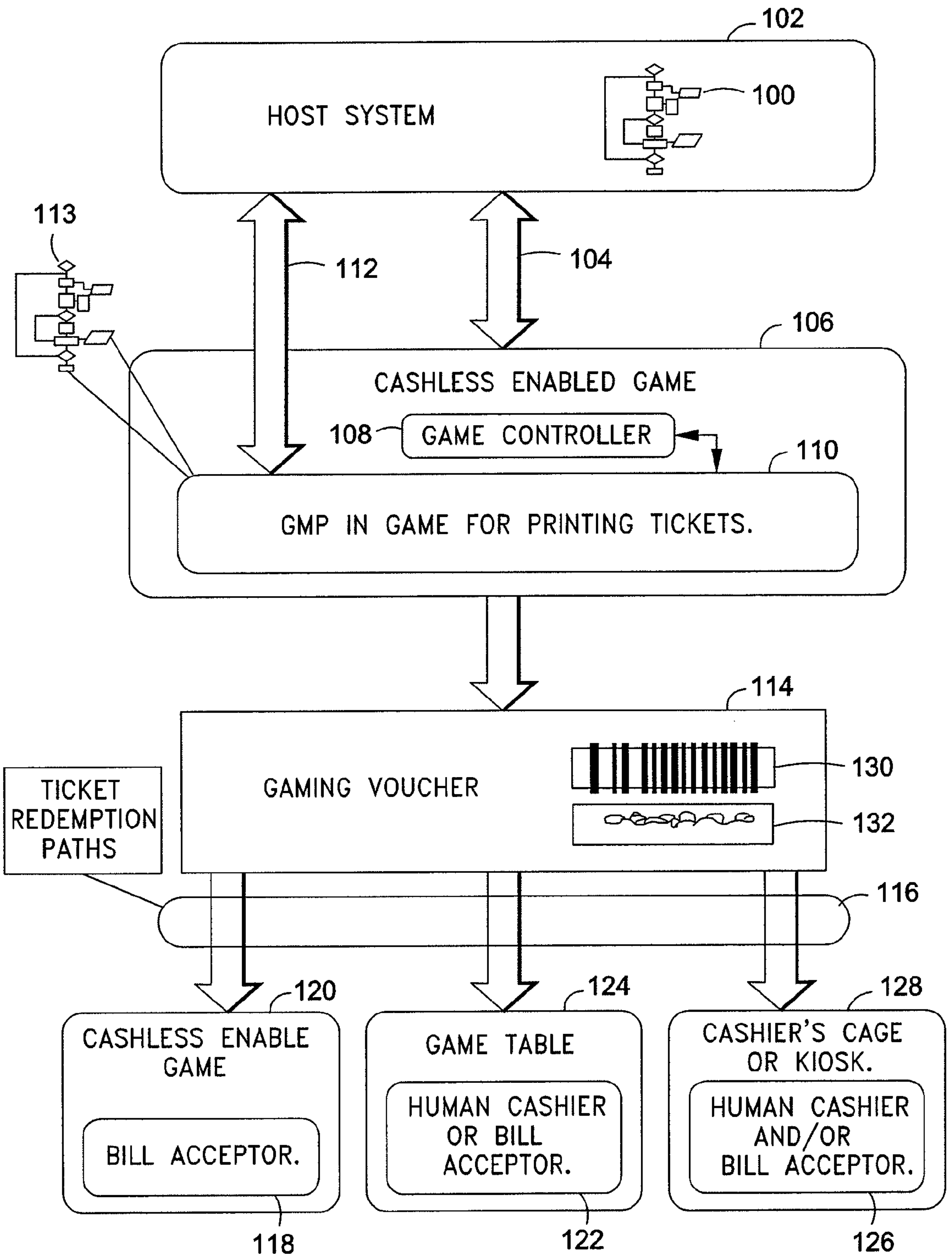
FIG. 1 is a cashless gaming system in accordance with an exemplary embodiment of the present invention.

FIG. 1 is a cashless gaming system in accordance with an exemplary embodiment of the present invention. A cashless gaming system includes a cashless gaming system controller 100 hosted by a system host 102 coupled 104 to one or more cashless enabled games 106. A cashless enabled game includes a game controller 108 that controls the operation of the cashless enabled game. The game controller is coupled to a gaming printer 110. The cashless enabled game uses the gaming printer to generate value bearing indica on vouchers and coupons, such as voucher 114. The gaming printer includes printing algorithms 113 in conjunction with stock on to which the value bearing indica are printed. A voucher includes the cash-out information for a player. The gaming printer may also be directly coupled 112 to the host system and cashless gaming controller. The voucher may be redeemed 116 in a variety of ways. The voucher may be redeemed by a human cashier or bill acceptor 122 at a game table 124, or a human cashier or bill acceptor 126 at a cashier's cage or kiosk 128, or by a bill acceptor 118 at another cashless enabled game 120. Redemption is only possible after the voucher passes a verification of account information 130 and validation using security signatures 132 included in the voucher.

Figure 2:
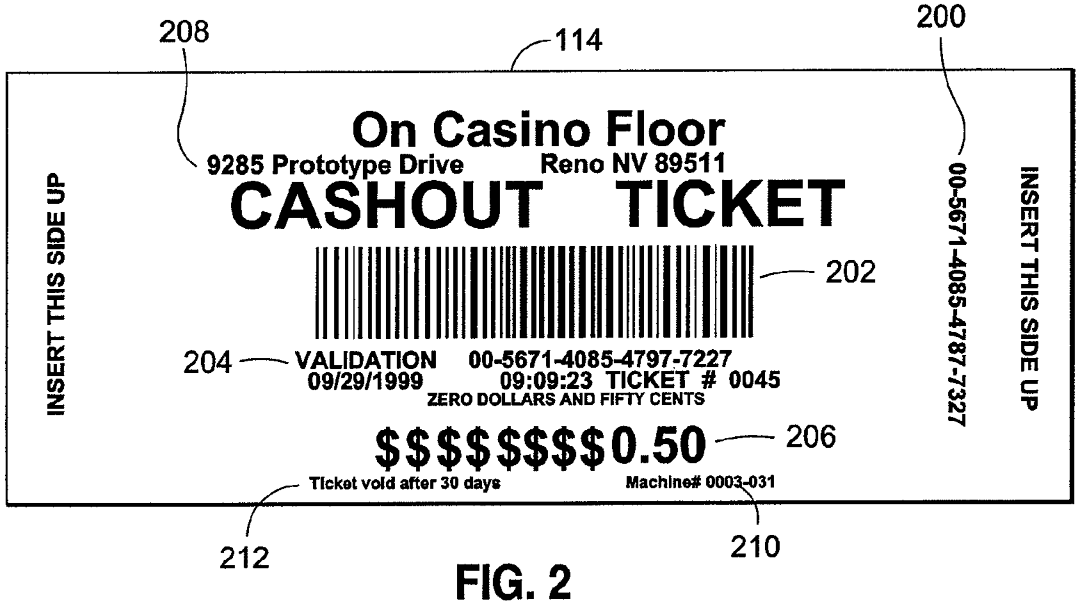
FIG. 2 is an illustration of a voucher in accordance with an exemplary embodiment of the present invention.

FIG. 2 is an illustration of a voucher in accordance with an exemplary embodiment of the present invention. The voucher shown is produced from commands issued by the cashless enabled game to the cashless gaming printer in response to a player's request to cash-out. The voucher 114 includes fields such as a validation number, printed in both a human readable form such as a character string 200 and in a machine-readable form such as a barcode 202, time and date stamps 204, cash-out amount 206, casino location information 208, cashless enabled game identifier 210, and an indication of an expiration date 212.

Figure 3:
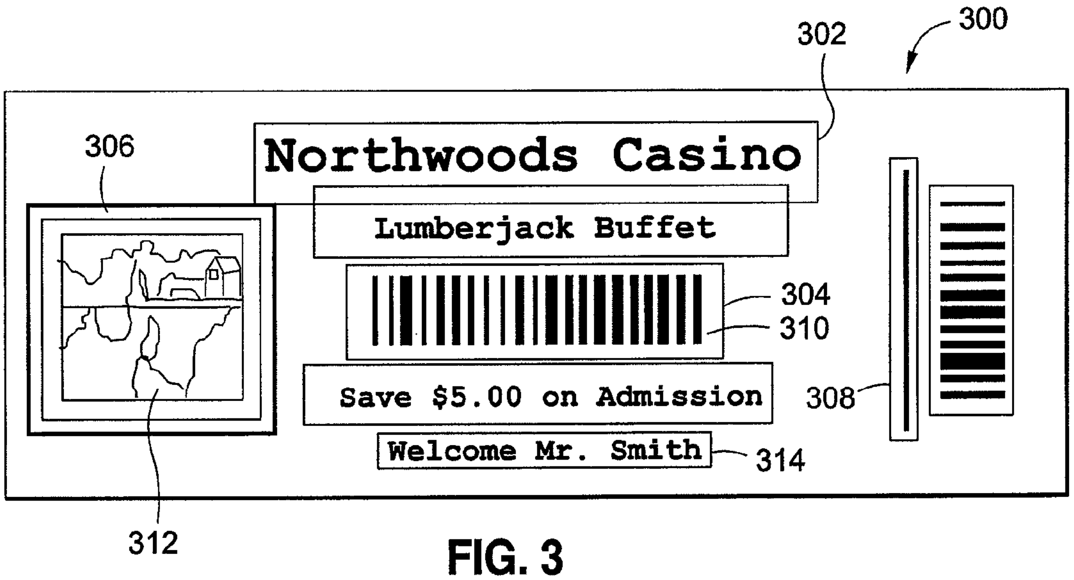
FIG. 3 is an illustration of a coupon including logical fields described in a template based printer language in accordance with an exemplary embodiment of the present invention.

FIG. 3 is an illustration of a coupon including logical fields described in a template based printer language in accordance with an exemplary embodiment of the present invention. In this example, a coupon may 300 include four types of data fields: text fields, such as text field 302; barcode fields, such as barcode field 304; graphic fields, such as graphic field 306; and line/box draw fields, such as line/box draw field 308.

The fields of a voucher or coupon are described using description data included in an electronic template that may be stored by a gaming printer. A template may include a plurality of fields in combination, resulting in a paste-up style printed voucher or coupon. A plurality of templates describing different types of vouchers or coupons may be stored in a gaming printer to support the operations of a casino or other establishement.

The actual value or data for each of the fields described in a template may or may not be included in the template itself. Instead, the template may include instructions for how to generate the voucher or coupon but may not include the actual data printed onto the voucher or coupon. For example, a template may include a barcode field for printing a barcode 310. However, the actual value of the barcode is transmitted to a gaming printer at the time a voucher or coupon is generated using the template. In this way, a voucher or coupon may have fields that include static data, such as graphic 312 in a graphic field, or dynamic data, such as the name of a particular patron 314 in a text field. In this way, customized vouchers or coupons may be printed by a gaming printer without transferring large amounts of data through a communications network coupling a gaming printer to a master promotional controller.

In addition, data that is used to track usage of vouchers or coupons may be included on the voucher or coupon. For example, a barcode field or a text field may be used to print a barcode value or text string uniquely identifying a voucher or a coupon. In this way, a gaming printer creates an image of a barcode or barcodes, characters or marks that may be read by a cashless enabled gaming machine bill acceptor on the same or another cashless enabled gaming machine, allowing automatic acceptance of vouchers or coupons into a cashless enabled gaming system in a casino or another related casino property.

A template includes a plurality of command strings. Each command string conforms to the following syntax:

```
    delimiter<cmd__Ltr>|<data__field1>|....|<data__fieldx>|delimeter;
    comment
where:
    delimiter = a delimiter character
    <cmd__ltr> =    command identifier letter
    <data__fields1-x> =    fields which include information relative to
    the command
    | =    Pipe character. This serves as the delimiter between data
fields in a command.
    ; =    Semi-colon. This is a comment field designator.
```

A template adheres to following syntax:

```
    delimiter<template__cmd__ltr>|<t__id>|<targ__mem>|<t__dim__da>|
    <t__dim__pa>|<pr#1>|<pr#2>| ... |<pr#n>|delimiter
where:
    <t__id> =    Template I.D.
    <targ__mem> =target memory storage.
    <t__dim__da> = Template dimension on a dotline axis in dots.
    <t__dim__pa> = Template dimension in dots in the paper axis.
    <pr#1>...<pr#n> =    list of voucher or coupon database
    resident print regions
```

ID's used in the format of this coupon. These fields are the method by which print regions used on a voucher or coupon are linked together and to the template.

A print region is a print field used in a template to format print data. The print region command is used to define the basic types of print regions such as text, barcode, graphics, and a line/box draw.

A define print region command defines the particular font, barcode, graphic, or line style which is to be used, and provides special formatting information on how it is to be used. Multiple print regions may be defined and memorized in a gaming printer's sectioned memory.

Figure 4:
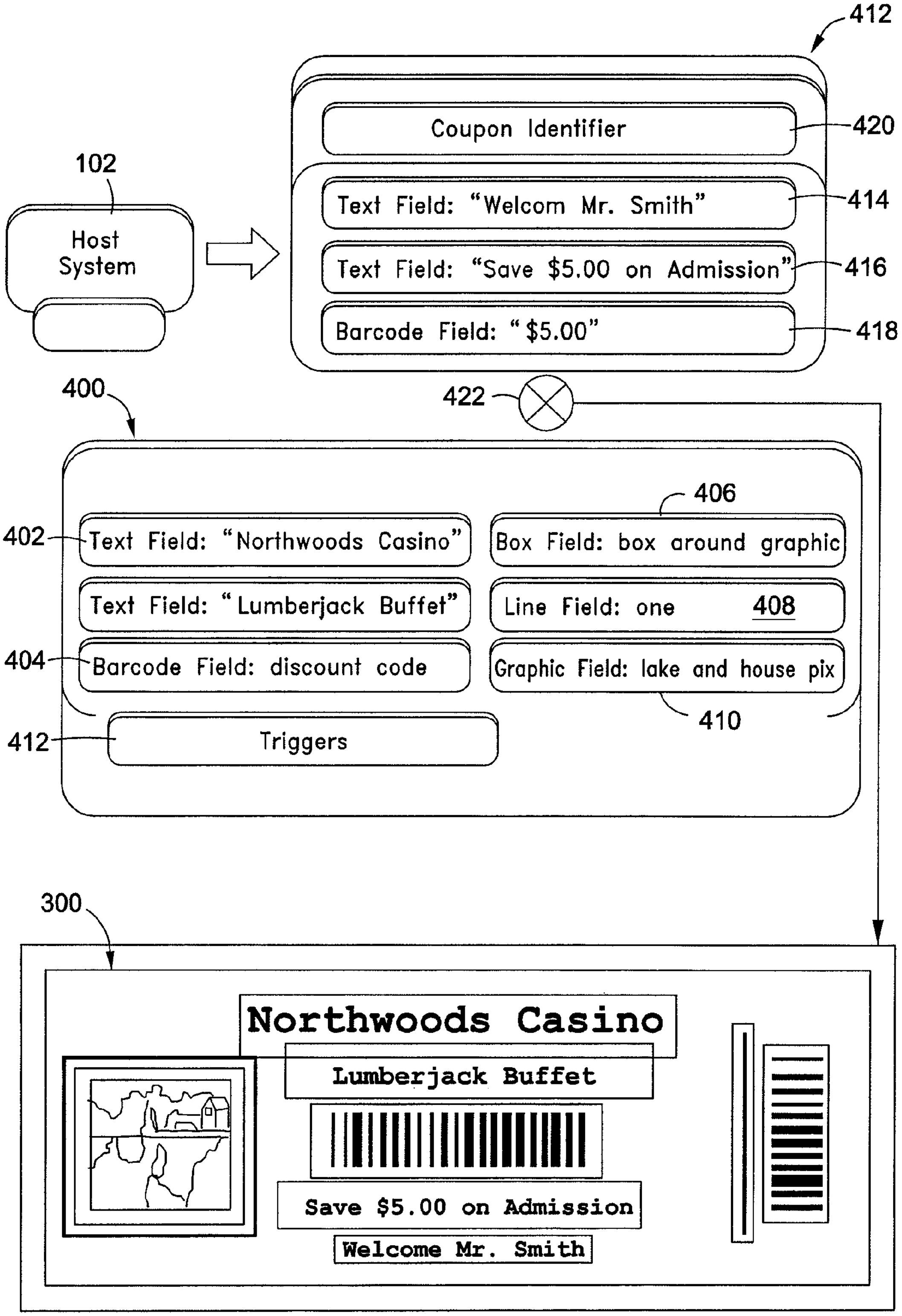
FIG. 4 is a block diagram of coupon template field elements stored partially resident in a promotional gaming printer and partially supplied by a master promotional controller at the time of print and issue in accordance with an exemplary embodiment of the present invention.

FIG. 4 is a block diagram of template field element stored partially resident in a gaming printer and partially supplied by a system host at the time of print and issue in accordance with an exemplary embodiment of the present invention. FIG. 4 illustrates how a system host selects a type of voucher or coupon and transmits particulars, such as variable data to be placed in fields in the coupon, for each print and issuance event.

Values for the fields that make up a coupon 300 may be divided into two groups or sets. A resident variable data set 400 may be stored locally in a gaming printer. The resident set of variable data may include variable data such as: variable data for a text field containing an identifier of a casino 402; variable data for a barcode field identifying a type of promotion 404; a template description used to generate a graphic such as box variable data 406 or line variable data 408; an identifier or actual variable data for a graphic 410; or triggers 412 used by the gaming printer to determine when a coupon should be printed. A dynamic variable data set include variable data for fields having variable data that are stored in the gaming printer and are saved in a template definition for a particular coupon. Examples of variable data in a dynamic variable data set include: text variable data for a player identifier 414; text variable data describing a promotion item 416; and barcode variable data 418 for quantifying a value of a promotion for printing on the coupon.

Both variable data sets may be transmitted from a system host 102 to a gaming printer in the form of communication packets. When a gaming printer receives a variable data set, the gaming printer stores the variable data set for future use. A resident variable data set includes variable data that may be reused for generating many vouchers or coupons; therefore, a resident variable data set may be stored in the gaming printer for an extended period of time. In contrast, a dynamic variable data set may be used for a short period of time, perhaps for even a single generation of a single voucher or coupon. As such, the dynamic variable data set and static variable data set associated in a voucher or coupon may be transmitted to a gaming printer at different times. To retain association between the variable data sets, part of the communication packet issued by the system host may include a reference 420 to a template definition so that the dynamic data in the communication packet can be combined 422 with the static field data stored in a gaming printer to generate a complete voucher or coupon 300.

Since it is possible to store all fields used in a voucher or coupon within the gaming printer's memory, a system host may issue a complete voucher or coupon by simply sending a reference to a voucher or coupon so defined to generate a voucher or coupon in its entirety. It is also possible for a system host to offload the entire live communication burden by sending a complete voucher or coupon database including triggers during off-peak times.

Figure 5:
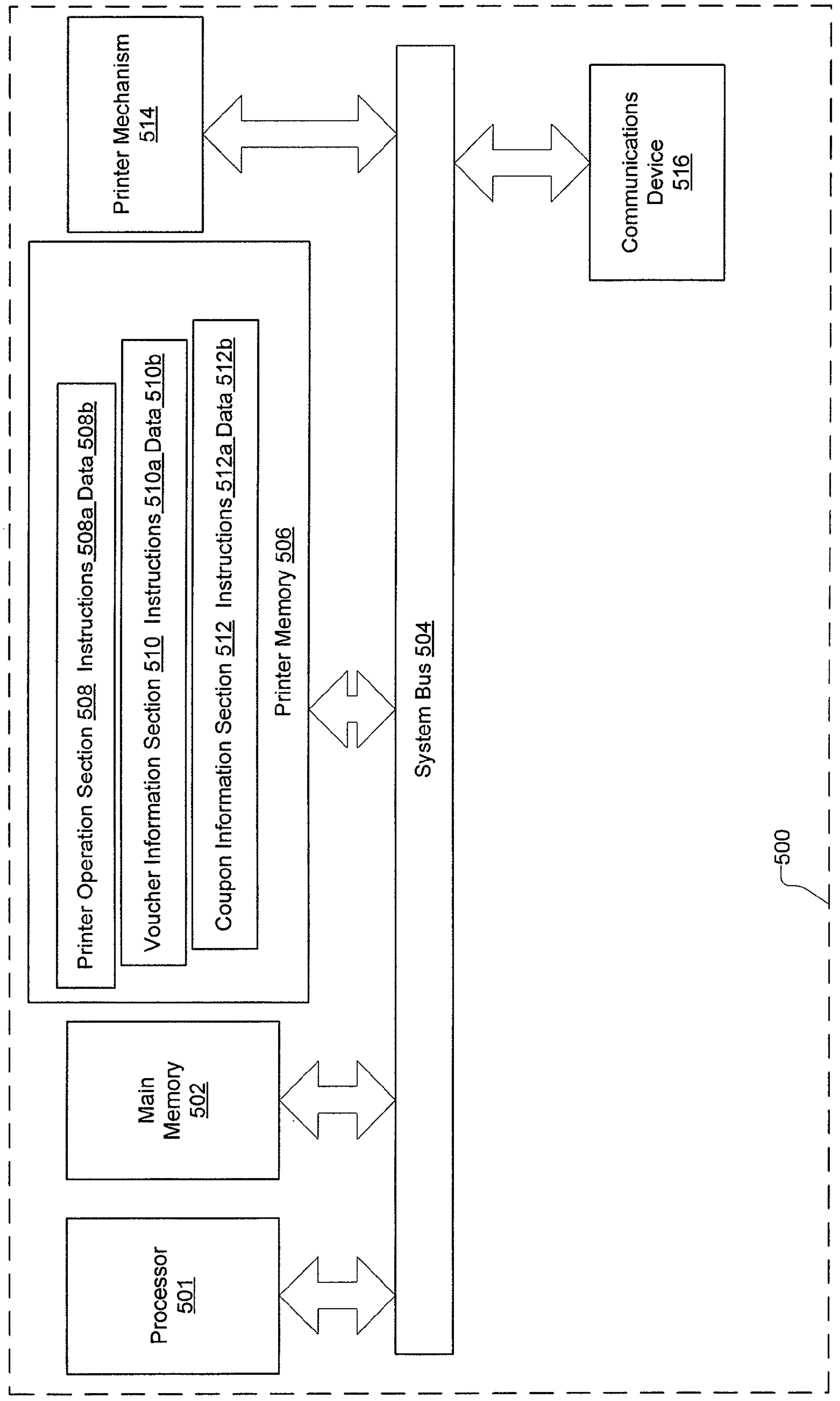
FIG. 5 is a block diagram of a printer controller used to control a gaming printer or a promotional printer in accordance with an exemplary embodiment of the present invention.

FIG. 5 is a block diagram of a printer controller used to control a gaming printer or a promotional printer in accordance with an exemplary embodiment of the present invention. The printer controller 500 includes a processor 501 coupled to a main memory 502 by a system bus 504. The printer controller also includes a printer memory 506 coupled to the processor by the bus.

The printer memory, either internal and/or external, may consist of such common devices as RAM, EPROM, EEPROM, FLASH Chips, magnetic storage devices such as floppy or hard drives, Flash Sticks and other storage media commonly used in the computer industry. The printer memory includes a plurality of memory sections that may be independently addressed for both content read and content write operations. A printer operation section 508 is included for storage of programming instruction codes 508*a* and printer data 508*b* used by the processor to operate the printer. The execution of these codes determines the conditions under which voucher information, including voucher generation instructions 510*a* and voucher data 510*b* included in a voucher information section 510 are utilized to generate a voucher. A coupon information section 512 included in the printer memory holds coupon generation instructions 512*a* and coupon data 512*b* used by the printer to generate a coupon.

Generally, the contents of printer operation section are not changed frequently. The contents of the voucher data section describe the format of the information that is printed on a gaming voucher. Contents of the voucher data section are changed rarely. The coupon section includes the data that describes the format of the information that is printed on a promotional coupon. The contents of the coupon section are changed frequently.

The printer controller is also coupled via the system bus to a printer mechanism 514 used to generate vouchers or promotional coupons. The processor uses the system bus to transmit control signals to the printer mechanism in order to generate the vouchers and promotional coupons in accordance with the voucher data and the coupon data stored in the printer memory.

One or more communications devices 516 may be coupled to the system bus for use by the printer controller to communicate with a cashless gaming system host 102 or a game controller 108 (both of FIG. 1). The printer controller uses the communication devices to receive commands, program instructions, voucher data, and coupon data from the external devices. In addition, the printer controller may use the communication devices to transmit printer status information to the external devices. Other communication devices may also be used by the printer controller to couple in a secure fashion over a local area network for administrative or other purposes.

Additional communication devices and channels may be provided for communication with other peripheral devices as needed. For example, one communication device may be provided with a local communications port, accessible from an exterior of a gaming machine, that a technician may use to communicate with the printer controller during servicing using an external controller. The external controller may communicate with the printer controller using an infrared link, other short-range wireless communication link, are a hard link with an external connector in a secure manner.

In operation, the processor loads the programming instruction codes included in the printer operation section into the main memory and executes the programming instruction codes to implement the features of a gaming printer or a promotional printer as described herein.

The partitioning of the memory into separate code and data sections allows separate signatures to be maintained for each section. A signature, as an example the results of a mathematical formula, may be generated for the memory content of a first section, such as the printer operation section, independently of all other memory sections. A second signature, again as an example of a mathematical formula, may be generated for a second memory section, such as the voucher data section, independently of all other memory sections. A third signature, again as an example of a mathematical formula, may be generated on a third memory section, such as the coupon section, independently of all other memory sections. The signatures provide an identifier that is statistically unique in describing the contents of each memory section. In addition, a signature may be generated for all of the memory sections combined.

Signatures may be generated using a variety of mathematical formulas. An exemplary mathematical formula is a checksum which is a computed value dependent on the contents of a block of data and which is transmitted or stored along with the data in order to detect corruption of the data. A system may recompute the checksum based upon any received data and compare the computer value with the value sent with the data. If the two values are the same, the system has some confidence that the data was not corrupted. The checksum may be 8 bits (modulo 256 sum), 16, 32, or some other convenient size. The checksum is computed by summing the bytes or words of the data block ignoring overflow. The checksum may be negated so that the total of the data words plus the checksum is zero.

Another mathematical formula useful as a signature is a Cyclic Redundancy Check (CRC). For a CRC, a value is derived from, and stored or transmitted with, the block of data in order to detect corruption. By recalculating the value and comparing it to the value originally transmitted, the receiver can detect some types of data corruptions. A CRC value is calculated using division either using shifts and exclusive ORs or table lookup (modulo 256 or 65536). The CRC value is "redundant" in that it adds no information. A single corrupted bit in the data will result in a one bit change in the calculated CRC values but multiple corrupted bits may cancel each other out. CRCs treat blocks of input bits as coefficient-sets for polynomials. A polynomial representing the data block is a "message polynomial". A second polynomial, with constant coefficients, is called the "generator polynomial". The generator polynomial is divided into the message polynomial, giving a quotient and remainder. The coefficients of the remainder form the bits of the final CRC value. So, an order-33 generator polynomial is necessary to generate a 32-bit CRC. The exact bit-set used for the generator polynomial will naturally affect the CRC that is computed.

Another exemplary mathematical formula is a one-way hash function—(Or "message digest function"). A one-way hash function is a one-way function which takes a variable-length block of data and produces a fixed-length hash. Given the hash it is computationally infeasible to find a message with that hash. A one-way hash function can be private or public, just like an encryption function. MD5, SHA and Snefru are examples of public one-way hash functions.

In practical use, the sectioned printer memory allows the contents of the second section and/or third section to be viewed individually and separately from the contents of the first section. This provides the interested regulators the ability to control the contents of the first section, (i.e. the execution of the computer codes contained in the first section that control the conditions under which the contents of the second section and/or third section are printed), without the need for a lengthy submission and approval process that is now required for minor content changes in the second section and/or the third section . Since the contents of the first section have been approved and remain unchanged, all of the control and security protocols remain in effect. The mathematical formula used to generate the statistically unique identifier or signature for the first section can still be used by interested regulators to verify that the operation of the printer has not changed, through alteration of the programming instruction codes or by other means.

The second section and third section contain the content of the printed image of a voucher and a coupon respectively. For example, in the case of a promotional coupon, the casino operator may want to change the image and contents of the promotional coupon frequently. In this case, the casino operator may then change just the third section of memory including the coupon data without disturbing the first section of memory. The conditions that cause the gaming voucher and/or promotional coupon to be printed are controlled by the gaming machine in accordance with the programming instruction codes and the coupon data.

A separate total signature may be generated that is inclusive of all individual memory sections, i.e. the printer operation section, the voucher data section, and the coupon section in the exemplary embodiment. In this way, the entire memory contents may be checked using a single signature if desired. The use of the total signature in combination with the signatures of the individual sections of printer memory allows interested regulators a high degree of confidence that the operation of the gaming printer has not changed from the approved model.

In practical use, the changes to the second section and/or the third section along with the signatures for each section can be submitted to interested regulators and loaded into the regulator's reference printer. The computer code included in the first section includes instructions for calculating a signature on any or all of the sections of printer memory described herein.

Referring again to FIG. 2, the exemplary gaming voucher used in cash-less gaming machines. The conditions necessary for printing a gaming voucher are controlled by the gaming machine and the conditions are communicated to and acted on by the computer code contained in the printer operation section of the printer memory. In the exemplary, the gaming machine sends the amount of the voucher, the validation number and other controlled information necessary to create a gaming voucher that is redeemable either for play or for currency.

The data contained in the voucher information section of the printer memory relates only to the format of the gaming voucher, such as the locations and size of the individual fields of the gaming voucher. This includes allowable static data such as name and location of the establishment.

Referring again to FIG. 3, the conditions necessary for printing a promotional coupon are controlled by the gaming machine and the conditions are communicated to and acted on by the computer code contained in the printer operation section of the printer memory. The gaming machine sends the amount of the voucher, the validation number and other controlled information necessary to create a promotional coupon, usually discounts on meals and the like. The data contained in coupon information section of the printer memory relates only to the format of the promotional coupon, such as the locations and size of the individual fields of the promotional coupons. Because of the promotional nature of this coupon, casinos desire to change the content of these coupons on a regular basis.

Figure 6:
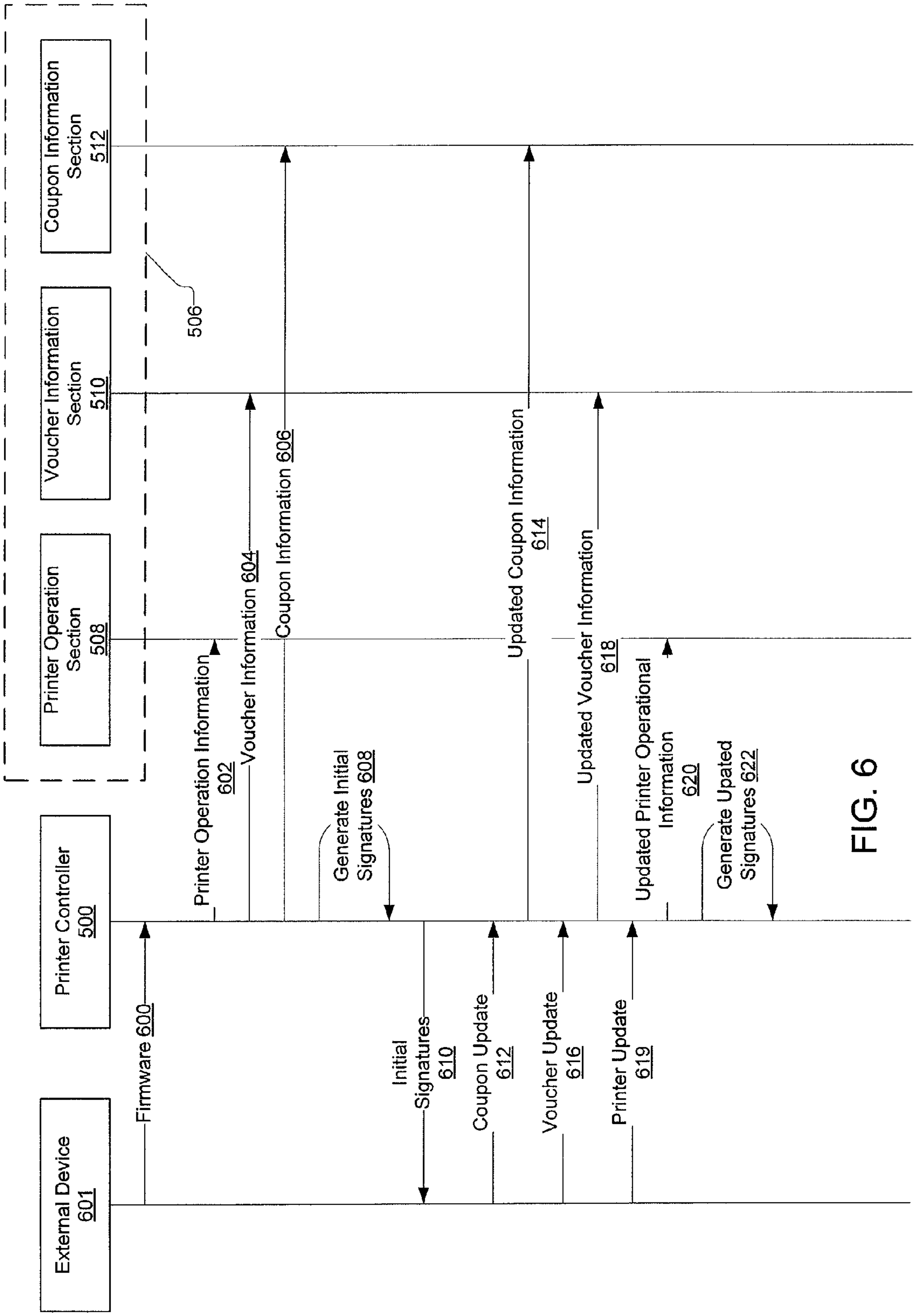
FIG. 6 is a sequence diagram describing storage and updating operations of a printer controller having a sectioned memory in accordance with an exemplary embodiment of the present invention.

FIG. 6 is a sequence diagram describing the operations of a printer controller having a sectioned memory in accordance with an exemplary embodiment of the present invention. A gaming printer controller 500 receives firmware 600 including printer information, voucher information, and coupon information for storage in sectioned printer memory 506. The firmware is received from an external device 601, such as a host system 102 (of FIG. 1) or a special purpose device used to load the printer memory. The printer controller writes the printer operational information into printer operation section 508 of the printer memory. The printer controller also writes voucher information 604 into voucher information section 510 and coupon data 606 into coupon information section 512 of the printer memory.

As the computer instructions code used by the printer controller include instructions for generating signatures as needed, the printer controller can generate (608) the initial signatures of the received and stored printer information, voucher information, and coupon information, along with the total signature of all three memory sections. These initial signatures 610 may be reported back to the external device for future reference or for confirmation that the printer information, voucher information, and coupon information have been successfully received and stored. Alternatively, the printer controller may need to do nothing as the signatures may be pre-generated externally by another device having knowledge of the printer memory configuration such as a reference printer controller.

During operation of the gaming printer, the external device may transmit a firmware update to the printer controller. The printer controller selects a memory section for storing the firmware update based on the contents of the firmware update. For example, the external device may transmit a firmware update including a coupon update 612 to the printer controller. The printer controller selects the coupon information section in order to store any included updated coupon information 614 into the printer memory. In a similar manner, the external device may transmit firmware including a voucher update 616. The printer controller takes the voucher update, selects the voucher information memory section, and stores any updated voucher information 618 in the voucher information memory section. Additionally, the external device may transmit firmware including a printer update 619 to the printer controller. The printer controller receives the printer update, selects the printer operation memory section, and stores any included updated printer operation information 620 in the printer operation section of the memory. If needed, the printer controller may then generate (622) updated signatures for any received updated information.

Figure 7:
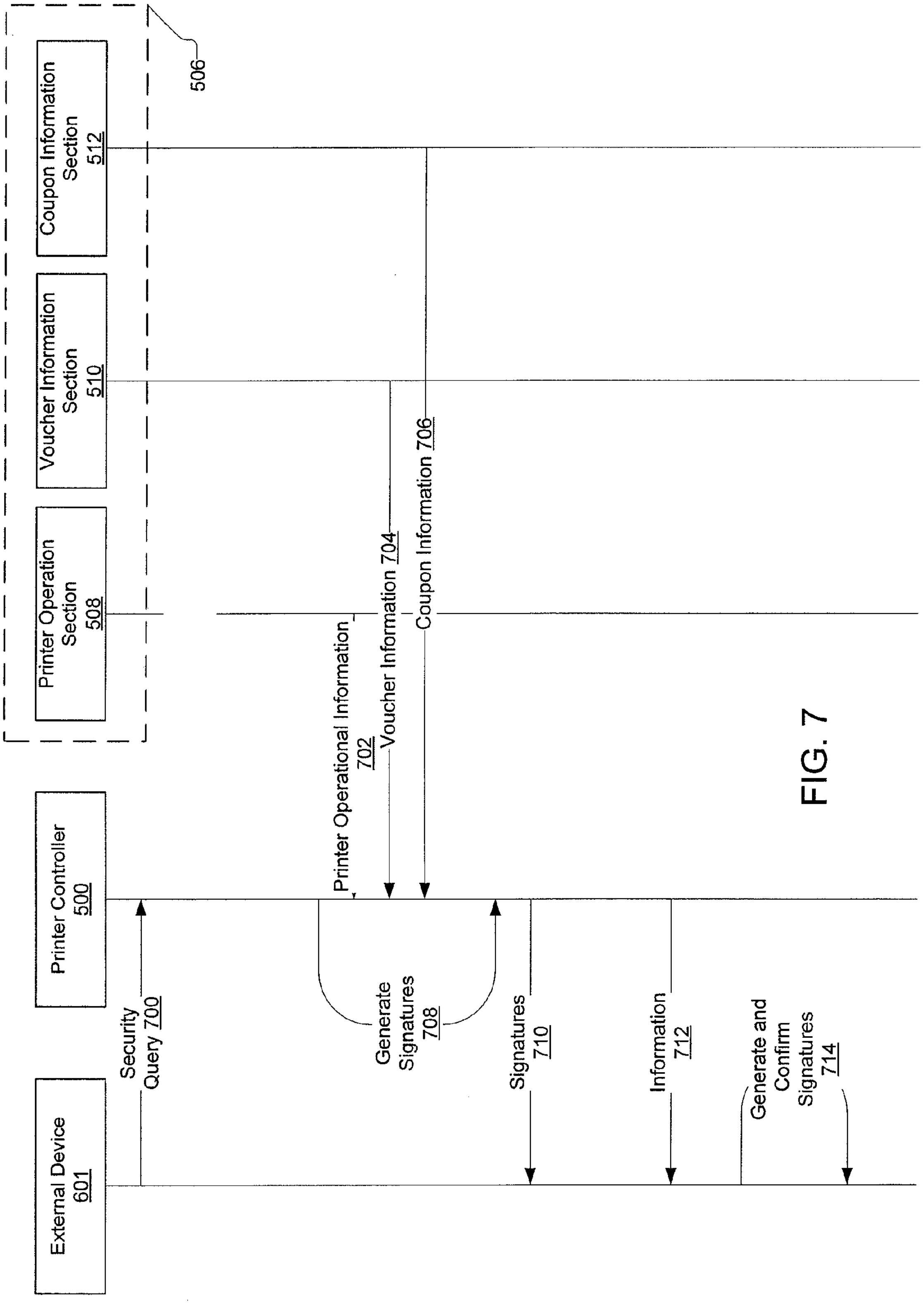
FIG. 7 is a sequence diagram describing security operations of a printer controller having a sectioned memory in accordance with an exemplary embodiment of the present invention.

FIG. 7 is a sequence diagram of a process for confirming the contents of the sectioned printer memory in accordance with an exemplary embodiment of the present invention. An external device 601, such as a system host or a reference printer, transmits a security request 700 to a printer controller 500. In response to the security request, the printer controller reads printer operation information 702 from printer operation section 508 of printer memory 506. The printer controller may also read voucher information 704 from voucher information section 510 and coupon information 706 from coupon information section 512. The printer controller may then generate (708) individual signatures for each of the memory sections and a total signature for the printer memory. The signatures 710 may then be transmitted to the external device for further processing.

Alternatively, the printer controller transmits all or part of the read information 712 to the external device. The external device then generates (714) individual and total signatures for the transmitted information to confirm the contents of printer memory 506.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this specification, accompanying drawings, and the claims' equivalents rather than the foregoing description.

What is claimed is:

1. A system for updating and confirming a gaming printer's firmware using an external device, comprising:
- a gaming printer including a printer memory, the printer memory comprising:
  - a code memory section, comprising:
    - printer operation programming instructions; and
    - printer data;
  - a voucher memory section, comprising:
    - voucher generation instructions; and
    - voucher data; and
  - a coupon memory section, comprising:
    - coupon generation instructions; and coupon data, wherein the gaming printer is constructed to:

generate a digital signature for a content of each memory section independently of each of the other memory sections;

receive by the gaming printer from the external device a firmware update, the firmware update including update content for a memory section to be selected from the code memory section, the voucher memory section, and the coupon memory section;

select by the gaming printer the memory section for storage of the firmware update on the basis of the firmware;

store by the gaming printer in the selected memory section the update content without altering the content of any non-selected memory section;

receive by the gaming printer a security request from the external device, the security request including a request for the content of a non-selected memory section; and transmit by the gaming printer to the external device, content from the non-selected memory section and a digital signature for the content of the non-selected memory section, in response to the security request, and wherein the external device is constructed to:

transmit the firmware update to the gaming printer;

transmit the security request to the gaming printer;

receive from the gaming printer the content from the non-selected memory section and the digital signature for the content of the non-selected memory section; and confirm by the external device the content of the non-selected memory section received from the gaming printer in response to the security request by generating a second digital signature for the content from the non-selected memory section and comparing the second digital signature to the digital signature received from the gaming printer.

2. The system of claim 1, wherein the printer is further constructed to generate a total digital signature for all of the plurality of memory sections.

3. The system of claim 1, wherein the digital signature is a Kobitron signature.

4. The system of claim 1, wherein the digital signature is generated as a checksum.

5. The system of claim 1, wherein the digital signature is generated using a cyclic redundancy check.

6. The system of claim 1, wherein the digital signature is generated using a one-way hash function.

7. The system of claim 1, wherein the update content is for the coupon memory section and the requested content is from a memory section selected from the group consisting of the voucher memory section and the code memory section.

8. The system of claim 1, wherein the update content is for the voucher memory section and the requested content is from a memory section selected from the group consisting of the coupon memory section and the code memory section.

9. The system of claim 1, wherein the update content is for the code memory section and the requested content is from a memory section selected from the group consisting of the coupon memory section and the voucher memory section.

10. A gaming printer, comprising:

a printer memory comprising:

a code memory section, comprising:

printer operation programming instructions; and printer data;

a voucher memory section, comprising:

voucher generation instructions; and voucher data; and a coupon memory section, comprising:

coupon generation instructions; and coupon data, wherein the gaming printer is constructed to:

generate a digital signature for a content of each memory section independently of each of the other memory sections;

receive from an external device a firmware update, the firmware update including update content for a memory section to be selected from the code memory section, the voucher memory section, and the coupon memory section;

select the memory section for storage of the firmware update on the basis of the firmware;

store in the selected memory section the update content without altering the content of any non-selected memory section;

receive a security request from the external device, the security request including a request for the content of a non-selected memory section; and transmit to the external device, content from the non-selected memory section and a digital signature for the content of the non-selected memory section, in response to the security request, the content from the non-selected memory section and the digital signature for confirming by the external device the content of the non-selected memory section by generating a second digital signature for the content from the non-selected memory section and comparing the second digital signature to the digital signature received from the gaming printer.

11. The gaming printer of claim 10, wherein the gaming printer is further constructed to generate a total digital signature for all of the plurality of memory sections.

12. The gaming printer of claim 10, wherein the digital signature is a Kobitron signature.

13. The gaming printer of claim 10, wherein the digital signature is generated as a checksum.

14. The gaming printer of claim 10, wherein the digital signature is generated using a cyclic redundancy check.

15. The gaming printer of claim 10, wherein the digital signature is generated using a one-way hash function.

16. The gaming printer of claim 10, wherein the update content is for the coupon memory section and the requested content is from a memory section selected from the group consisting of the voucher memory section and the code memory section.

17. The gaming printer of claim 10, wherein the update content is for the voucher memory section and the requested content is from a memory section selected from the group consisting of the coupon memory section and the code memory section.

18. The gaming printer of claim 10, wherein the update content is for the code memory section and the requested content is from a memory section selected from the group consisting of the coupon memory section and the voucher memory section.

* * * * *